Feb. 28, 1928.  
W. J. ANDRES  
BRAKING SYSTEM  
Filed Nov. 19, 1925  
1,660,951  
3 Sheets-Sheet 3

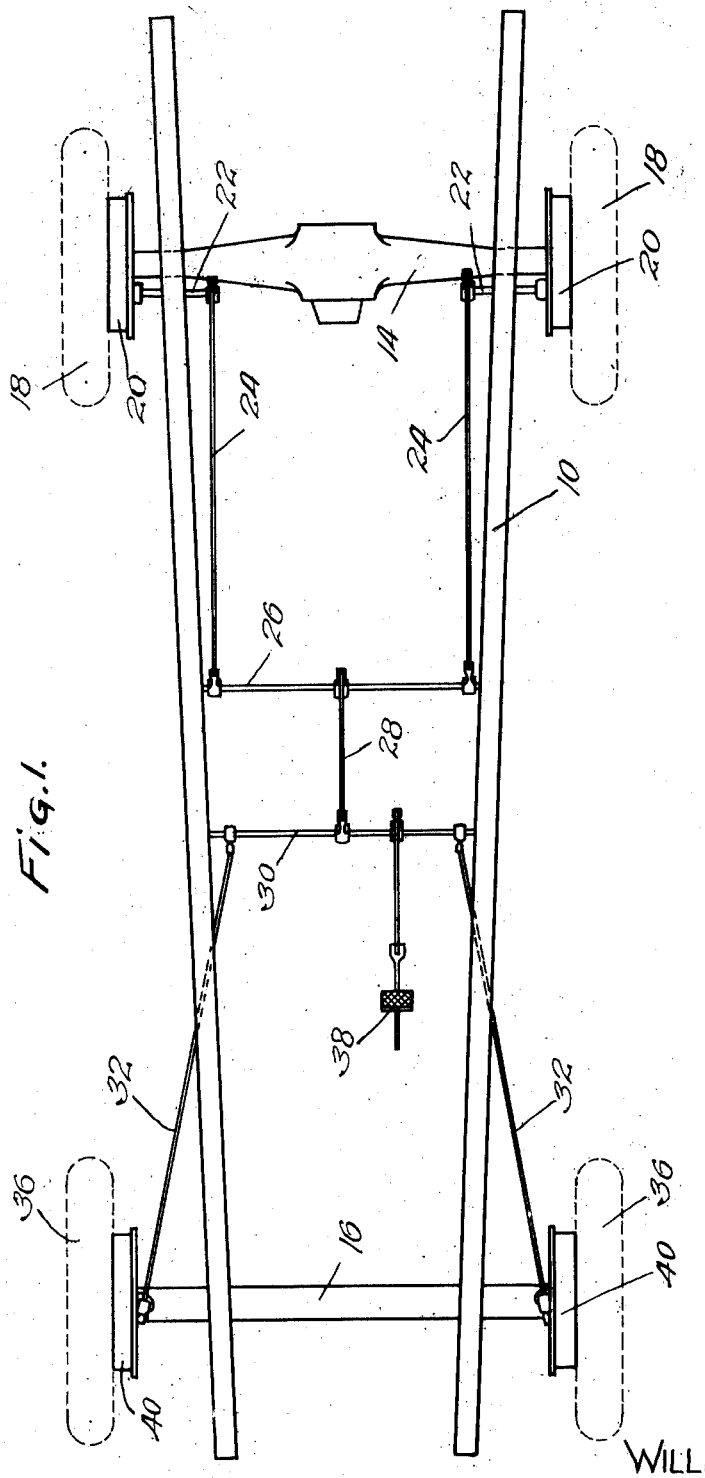

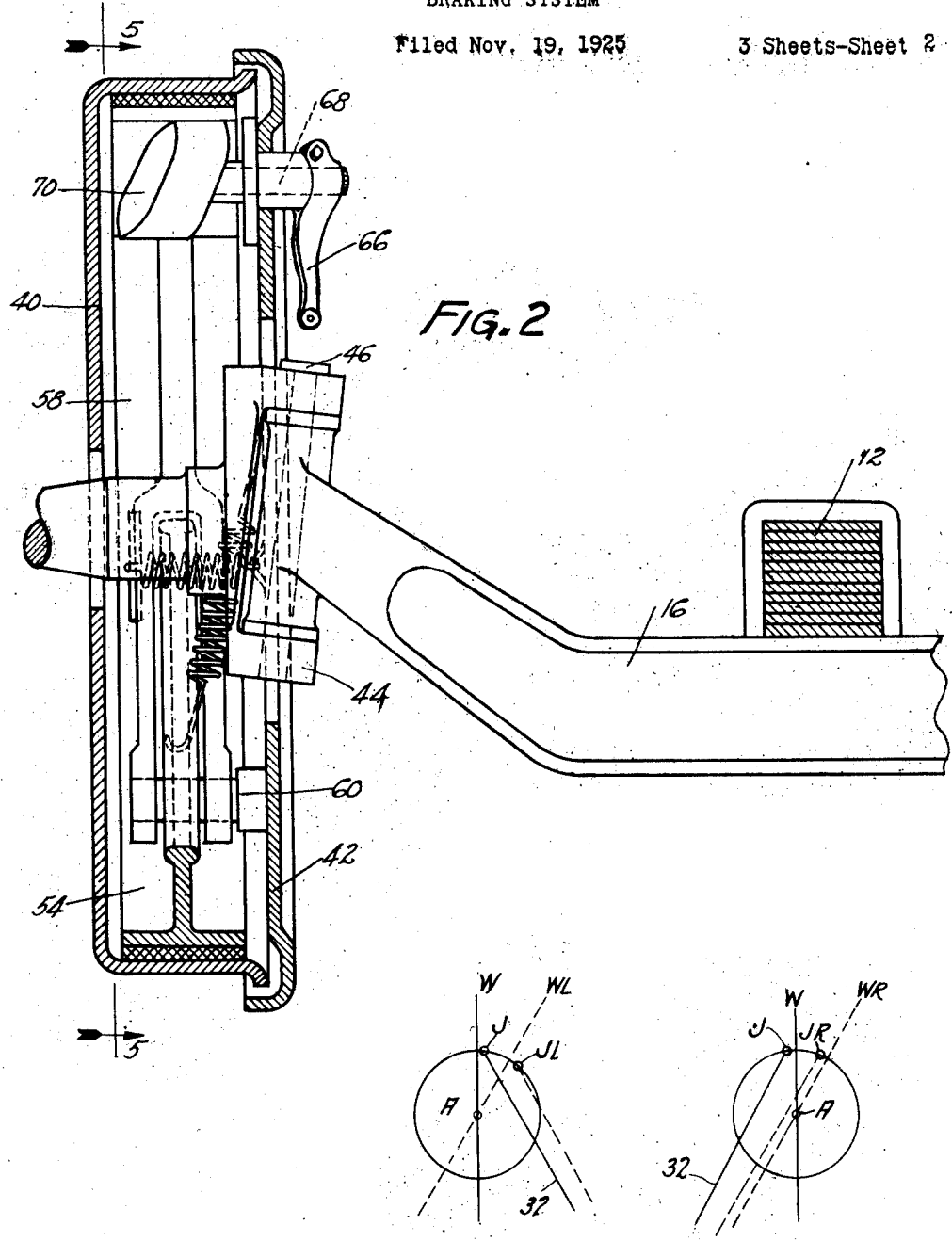

INVENTOR  
WILLIAM J. ANDRES  
BY  
*M. W. McConke*  
ATTORNEY

Patented Feb. 28, 1928.

1,660,951

UNITED STATES PATENT OFFICE.

WILLIAM JOSEPH ANDRES, OF SOUTH BEND, INDIANA, ASSIGNOR TO BENDIX BRAKE COMPANY, OF CHICAGO, ILLINOIS, A CORPORATION OF ILLINOIS.

BRAKING SYSTEM.

Application filed November 19, 1925. Serial No. 69,948.

This invention relates to brakes, and is illustrated as embodied in an automobile chassis having brakes on all four wheels. An object of the invention is to provide a simple system of operating connections insuring a direct pull on the brake-applying device, by inclining the shaft for the cam or its equivalent so that its axis is substantially perpendicular to the line of pull. If used on front or other swivelled wheels, the connections may, if desired, be arranged to relieve the pressure on the outer brake, preferably without substantially increasing the pressure on the inner brake.

The above and other objects and features of the invention, including various novel combinations of parts and desirable particular constructions, will be apparent from the following description of one illustrative embodiment shown in the accompanying drawings, in which:

Fig. 1 is a top plan view of the chassis;

Fig. 2 is a vertical section through one front brake;

Fig. 3 is a diagram, indicating the two front brakes in top plan, and illustrating the relief in pressure on the outer brake without substantially increasing the pressure on the inner brake;

Figure 4:
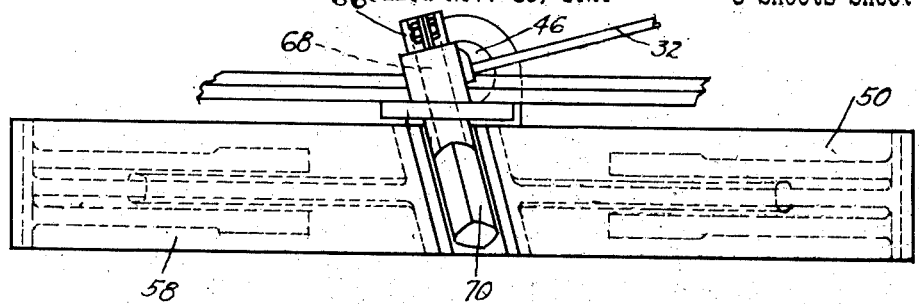
Fig. 4 is a top plan view of one of the novel brakes, with the drum removed.

The chassis illustrated includes a frame 10 supported by the usual springs 12 on a rear axle 14 and front axle 16. The rear wheels 18 have brakes 20 operated by shafts 22 connected by rods or cables 24 to a cross shaft 26, which in turn is connected by a brake rod 28 with a shaft 30 operating the cables or equivalent tension members 32 for the brakes for the front wheels 36. Shaft 30 is rocked to apply the four brakes by a pedal 38. Except as further described below, the above-listed parts or their equivalents may be of any desired construction.

Each of the front brakes is shown as including a drum 40 rotating with the wheel 36, and a backing plate 42 carried by the knuckle 44, which rotatably supports the wheel and which is shown swivelled to the axle by a king-pin 46. Between plate 42 and drum 40 is arranged the brake, shown as a Bendix type three-shoe brake including a reverse shoe 50 anchored at 52, a central shoe 54 anchored at 56, and a servo shoe 58 connected to shoe 54 at 60. A spring 62 urges shoes 50 and 58 away from the drum, and an auxiliary spring 64 holds shoe 54 away from the drum until overcome by movement of shoe 58. Anchor 56 for shoe 54 passes through a large clearance opening in shoe 50, and anchor 52 for shoe 50 passes through a relatively large opening in shoe 54.

According to one feature of the invention, each tension member 32 is connected to an arm 66 swinging in a generally vertical plane inclined with respect to the wheel. That is, as appears in Fig. 1, members 32 are in a vertical plane extending rearwardly from the brakes toward shaft 30, and arms 66 are substantially in this plane, so that there is a straight pull on the arms. Each arm 66 is clamped on a shaft 68 for a cam 70, or other operating device, which shaft is inclined with respect to the plane of the wheel in such a manner that it is substantially perpendicular to the plane of member 32 and arm 66. This shaft, however, is substantially in a horizontal plane,—i. e., it is in a plane perpendicular to the plane of the wheel but is not itself perpendicular to the plane of the wheel.

Figure 5:
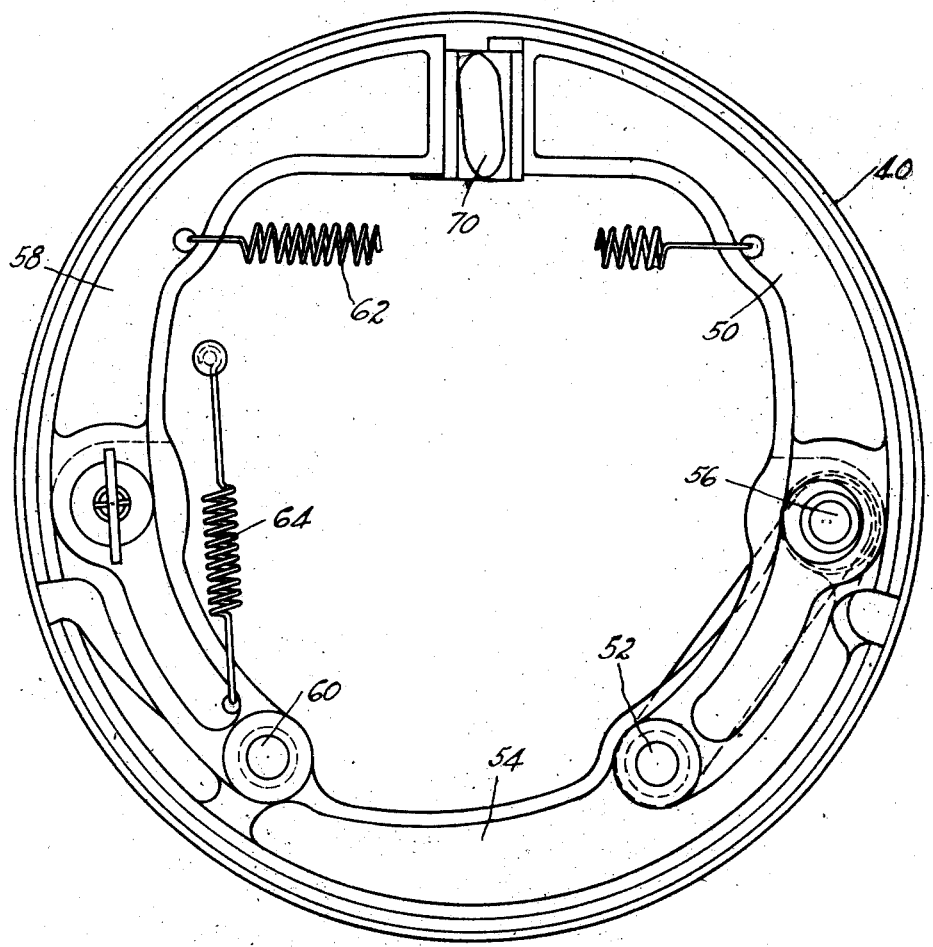
Fig. 5 is a vertical section through the brake on the line 5—5 of Fig. 2.

Cam 70 is distorted with respect to the axis of shaft 68, the upper end being carried toward the top of the sheet in Fig. 4, and the lower end carried downwardly, so that the cam is not perpendicular to the axis of shaft 68, as usual, but is inclined as appears in Fig. 2 so that it engages uniformly the parallel inclined end surfaces of shoes 50 and 58. It will be noted that shoes 50 and 58 are interchangeable by reversing them about the vertical diameter of the drum (Fig. 5).

In applying the brake, the joint between arm 66 and the tension member 32 may be swung from an idle position forwardly of the swivelling axis (i. e., the axis of king-pin 46) rearwardly to an active position substantially in that axis, thus permitting the wheel to be swivelled whether or not the brakes are applied.

I prefer, however, that the active position of the joint be not exactly in the swivelling axis, but slightly at one side of that axis, and so arranged that when the wheels are swivelled to round a corner the pressure on the outer brake is automatically relieved without any substantial increase of pressure on the inner brake.

As diagrammed in Fig. 3, the wheels are swung from straight ahead positions, parallel to lines W passing through the swivelling axes A, in turning a corner to the right, to positions WL and WR respectively. J indicates the active position of each joint between an arm 66 and its member 32, and is shown as in front of the axis A and on the opposite side of that axis from the wheel. When the wheels are swivelled to the right, to new positions parallel to WL and WR, joints J are also moved, the outer joint moving to JL and the inner one to JR. It will be seen that the arc J—JL is nearly in the direction of the tension on member 32, and consequently gives considerable relief on the outer brake. On the other hand J—JR is nearly perpendicular to the direction of the tension on its member 32, and increases the pressure on the inner brake very little,— much less than the pressure on the outer brake is relieved.

It will be seen that the illustrated positions of the joints is a highly advantageous compromise. If joints J were arranged so that members 32 were tangent to the circles, the pressure on the inner brake would be increased exactly as much as the pressure on the outer brake was relieved, except in so far as in steering an automobile the inner wheel usually swivels a few degrees further than the outer wheel. On the other hand, if members 32 passed over the axes A diametrically of the circles, swivelling the wheels in either direction would slightly relieve the pressure on both brakes. By selecting the points as described, a considerable relief is given the outer brake without an undesirable tightening of the inner brake.

While one illustrative embodiment of the invention has been described in detail, it is not my intention to limit its scope to that particular embodiment, or otherwise than by the terms of the appended claims.

I claim:

1. A vehicle having wheels with brakes, and comprising, in combination therewith, brake-operating connections including tension members diverging toward the brakes from the vehicle, an operating device for each brake, and a shaft for each operating device which is inclined in a horizontal plane with respect to the brake and is substantially perpendicular to the corresponding tension member and which is rocked by tension on said member.

2. A vehicle having swivelled wheels with brakes, and comprising, in combination therewith, brake-operating connections including tension members diverging toward the brakes from the vehicle, an operating device for each brake, a shaft for each operating device which is inclined with respect to the brake and is substantially perpendicular to the corresponding tension member, and an arm on each shaft connected to the corresponding tension member by a joint which is movable in applying the brake from a position spaced forwardly of the swivelling axis rearwardly toward the swivelling axis.

3. A brake comprising, in combination, a drum, shoes within the drum having adjacent substantially parallel end surfaces inclined with respect to the axis of the drum, a shaft between the ends of the shoes with its axis substantially parallel to said ends, and a cam on the shaft for forcing said ends apart.

4. A brake comprising, in combination, a drum, reversibly interchangeable shoes within the drum having adjacent substantially parallel end surfaces inclined with respect to the axis of the drum, a shaft between the ends of the shoes with its axis substantially parallel to said ends, and a cam on the shaft for forcing said ends apart.

5. Operating means for a brake for a swivelled wheel comprising, in combination, a brake-applying arm swivelling with the wheel and swinging in a generally vertical plane, brake-operating connections including a tension member, and a joint directly connecting the arm and said tension member and movable in applying the brake from an idle position spaced forwardly of the swivelling axis rearwardly toward that axis.

6. Operating means for a brake for a swivelled wheel comprising, in combination, a brake-applying arm swivelling with the wheel and swinging in a generally vertical plane making an acute horizontal angle with the plane of the wheel, brake-operating connections including a tension member substantially in said inclined plane, and a joint between the arm and said tension member movable in applying the brake from an idle position spaced forwardly and outwardly of the swivelling axis rearwardly and inwardly toward that axis.

7. Operating means for a brake for a swivelled wheel comprising, in combination, a brake-applying arm swivelling with the wheel and swinging in a generally vertical plane, brake-operating connections including a tension member, and a joint between the arm and said tension member movable in applying the brake from an idle position spaced forwardly of the swivelling axis rearwardly to an active position so arranged with respect to the swivelling axis as to relieve the pressure on the brake when the wheel is swivelled to place it on the outside of a turn.

8. Operating means for a brake for a swivelled wheel comprising, in combination, a brake-applying arm swinging in a generally vertical plane, brake-operating connections including a tension member, and a joint between the arm and said tension member movable in applying the brake from an idle position spaced forwardly of the swivelling axis rearwardly to an active position so arranged with respect to the swivelling axis that swivelling the wheel to place it on the outside of a turn swings said joint in the direction of the tension on said member.

9. A vehicle having a pair of wheels with brakes, each swivelling about a generally vertical axis and operating connections for the brakes including parts swivelling with the wheels and operating means connected to said parts by joints spaced respectively from the two swivelling axes, and so located that said means acts on said joints in directions making acute angles with lines from the joints to the swivelling axes, so that swivelling the wheels to round a corner automatically relieves the pressure on the outer brake without substantially increasing the pressure on the inner brake.

10. A vehicle having a pair of swivelled wheels with brakes, and mechanical force-transmitting operating connections for the brakes including joints arranged to permit the swivelling of the wheels and so spaced from the swivelling axes of the wheels that lines from said axes to the respective joints make angles of approximately 45° with the directions of the forces exerted on the joints by said connections, so that swivelling the wheels to round a corner automatically relieves the pressure on one brake without substantially increasing the pressure on the other brake.

11. A vehicle having a pair of swivelled wheels with brakes, and operating means for applying the brakes including brake-operating devices and tension members connected by joints so located that lines from the joints to the respective swivelling axes make acute angles with said members, so that swivelling the wheels to round a corner automatically swings the outer joint in the direction of the tension on its member and at the same time swings the inner joint more nearly at right angles to its tension member so as not to vary in any substantial degree the effective force on the inner brake.

12. A brake comprising, in combination, shoes having substantially parallel end surfaces inclined with respect to the plane of the shoes, an inclined camshaft parallel to said end surfaces and having its axis in a plane perpendicular to the plane of the shoes, and a cam on the inclined shaft which is inclined with respect to the axis of the shaft and which acts on said end surfaces.

In testimony whereof I have hereunto signed my name.

WILLIAM JOSEPH ANDRES.